(No Model.)
J. E. BRIGGS.
SPECTACLES.
No. 443,160. Patented Dec. 23, 1890.
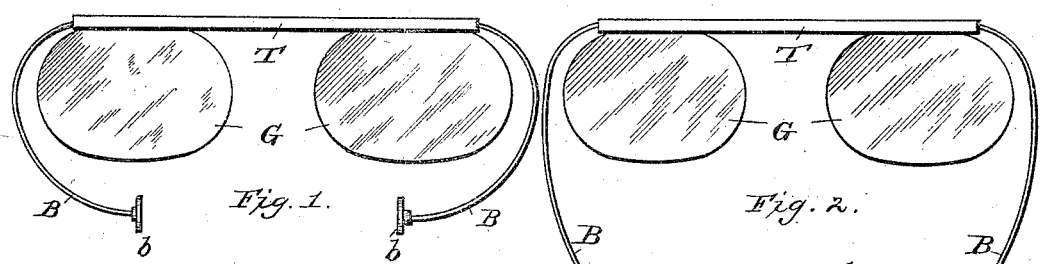
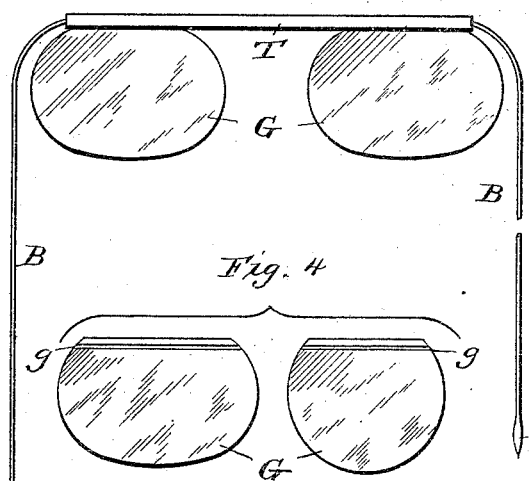
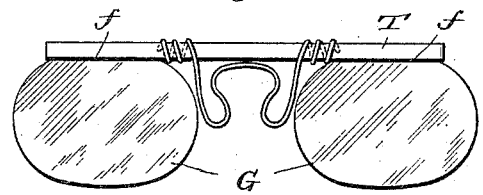
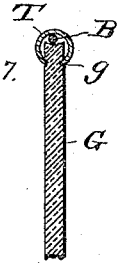
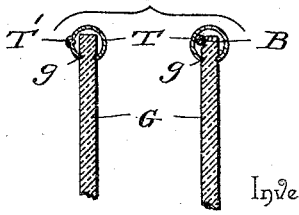
Witnesses
H. L. Amer.
N. L. Collamer.
By his Attorneys,
C. A. Snow & Co.
Inventor
James E. Briggs.

UNITED STATES PATENT OFFICE.

JAMES E. BRIGGS, OF ROCHESTER, NEW YORK.

SPECTACLES.

SPECIFICATION forming part of Letters Patent No. 443,160, dated December 23, 1890.

Application filed February 12, 1890. Serial No. 340,144. (No model.)

*To all whom it may concern:*

Be it known that I, JAMES E. BRIGGS, a citizen of the United States, residing at Rochester, in the county of Monroe and State of New York, have invented new and useful Spectacles, of which the following is a specification.

This invention relates to spectacles; and its object is to provide a pair of spectacles of the greatest simplicity and strength of setting and of the least possible weight, which shall be so constructed that the glasses thereof are capable of being turned to any desired angle to the adopted line of vision, or may be thrown upwardly above the eyes and out of any line of vision when not in immediate use. This object I accomplish by the use of only two pieces in connection with the usual glasses. These consist, essentially, of either a double or single tubiform piece applied along the upper edges of the glasses or the frames therefor, and to which they are rigidly connected, and a wire spring, passing through and frictionally engaged in said tube, constituting in itself the pivot of a continuous hinge and holding the spectacles or eyeglasses upon the head of the wearer by curves over the ears or by clasping the head or by pressing the temples, as well as of other adjunctive and specific details of construction incident thereto, which assist in carrying out said object, together with certain auxiliaries which tend to enhance the value of the completed device, all as hereinafter more fully described, and as illustrated in the accompanying drawings, in which—

Figure 1 is a plan view of a pair of my improved spectacles provided with a temple-clasp bow. Figs. 2 and 3 are similar views showing, respectively, the ear-clasp bow and the head-clasp bow. Fig. 4 is a similar view showing some of the different forms of glasses which may be used. Fig. 5 is an enlarged view showing the manner of attaching the bow to the tube. Fig. 6 is a bottom plan view of the tube, showing the opening therein for the reception of the bow and glasses. Fig. 7 is an enlarged transverse section through the tube, bow, and glasses. Fig. 8 shows modifications of Fig. 7. Fig. 9 is a plan view of the form used for eyeglasses.

Heretofore it has been common to provide spectacles with glasses which were adapted to be turned upwardly out of the line of vision, means being employed to hold them in such raised position; but I am not aware that spectacles have ever been constructed as herein set forth, whereby the glasses could be set at any angle.

In the said drawings, the letter B designates the bow, which is formed of a single piece of spring-wire and may be provided with ear-curves at its ends, or shaped in any other manner or length, as desired, and as shown at b.

The letter T designates a tube, preferably metallic, through which the straight body of the bow B passes and in which it turns with sufficient friction to hold the glasses at any angle. The tube T is of course straight throughout its length; otherwise it could not turn upon its pivot or bow. To the lower side of this tube I connect the glasses G or the frame which carries them in a manner which will now be described. When a frame is used, it is preferably rigidly connected at points at the upper sides of the frames proper and of the nose-piece to the lower outer face of the tube, which in this use has only inside capacity to hold the bow.

When glasses G are connected directly with the tube, which construction I prefer, said tube is provided with a longitudinal opening, recess, or chamber $t$ along its lower edge, constituting the female part of the hinge. Into this open side of the tube the straight upper edge of the glass G is inserted by passing it inwardly from the open end of the tube. After inserting the glasses and adjusting them to the width required the sides of this opening are pressed together above the nose and at the ends, thereby forming a complete tube at those points. The faces of the glass at a short distance from its straight edge are preferably provided with grooves $g$, in which the edges of the tube are seated, as shown in Fig. 7, and the bow may pass along the edge of the glass, as shown in this figure, or may pass at the side thereof along a bevel on the glass, but within the tube T; or it may be seated in an internal groove T' along one side of the tube, as shown in Fig. 8, which form is preferable to those who desire to throw the glasses farther away from the eye. After laying the wire for the bow in place the glasses are pressed inwardly in the groove toward the center of the tube until their inner sides are a suitable distance apart, according to the width of the wearer's nose, when the metal sides of the tube are pressed together in the center and ends, as above suggested.

In operation the hooks $b$ of the bows are passed over the ears and the glasses adjusted to their proper position on the nose and in front of the eyes. If now the user is reading, with book in the usual position, the lower edges of the glasses are pressed close in against the cheeks; or, if it is desired to change the angle of the glass to any other line of vision for any cause, it can be instantly done by touching either one, and when done the glasses will remain at such angle, being retained by the friction of the tube its whole length upon the bow. When it is desired to throw the glasses out of use, they are turned upwardly and out of the line of vision, as will be readily understood. Both glasses being attached to the tube, the turning of one turns the other, and the uses and operation of the device would be exactly the same if the glasses were surrounded by frames.

The bow B may be dispensed with, if desired, and a spring nose-clasp be provided, as shown in Fig. 9, which shall frictionally bear upon the sides of the wearer's nose, thus making the device a pair of eyeglasses. In this case the nose-clasp would be independent from the glasses, but would be connected frictionally with the exterior of the tube T at points between the glasses, the tube thus becoming the pivot upon which the glasses turn to any line of vision or out of line without changing the position of the nose-clasp, all as will be clearly understood.

What I claim is—

1. The herein-described spectacles, the same comprising a straight tube to which a pair of glasses are rigidly secured, and a clasp, its ends engaging the head of the wearer and its body frictionally engaging said tube, as set forth.

2. The herein-described spectacles, the same comprising a straight tube, a pair of glasses having straight upper edges rigidly secured within said tube, and a clasp-bow, its ends engaging the head of the wearer and its body passing through said tube and frictionally engaging the same, as set forth.

3. The clasp-bow B, having a straight body, and the tube T, surrounding said body, the lower side of the tube being open, as at $o$, near its ends, in combination with the glasses G, having straight upper edges and provided with notches $g$ in their faces near said edges, said edges being inserted in the openings in the tube and the body of the latter engaging said notches, substantially as described.

4. The clasp-bow B, having a straight body, and the tube T, surrounding said body and having an internal longitudinal recess or chamber T', in which it is frictionally engaged, the lower side of the tube being open, as at $o$, near its ends, in combination with glasses G, having notches $g$ in their faces near their upper edges, said edges being inserted in the openings in the tube and the body of the latter engaging said notches, substantially as described.

5. In spectacles, a slotted tube, glasses inserted in the ends of the slot, the tube being bent to hold them therein, and means, substantially as described, for supporting the tube upon the head of the wearer, as set forth.

6. The herein-described spectacles, the same comprising a straight tube to which a pair of glasses are rigidly secured, and a clasp engaging the head of the wearer and frictionally engaging the tube, as set forth.

7. In spectacles, the combination, with the tube T and means for supporting it upon the wearer's head, one side of the tube being open, of the glasses G, having straight edges inserted in said open side, the metal of the sides of the tube being bent together between and at each end of the glasses, as and for the purpose set forth.

In testimony that I claim the foregoing as my own I have hereto affixed my signature in presence of two witnesses.

JAMES E. BRIGGS.

Witnesses:
FRANK W. HUGHES,
JOHN S. BRIGGS.